United States Patent
Haas et al.

(10) Patent No.: US 9,871,562 B2
(45) Date of Patent: Jan. 16, 2018

(54) RFID/NFC-SYSTEM AND AN RFID/NFC-ELEMENT

(71) Applicant: Pepperl+Fuchs GmbH, Mannheim (DE)

(72) Inventors: Christian Haas, Mannheim (DE); Stefan Kahlau, Mannheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 0 days.

(21) Appl. No.: 15/118,553

(22) PCT Filed: Nov. 25, 2014

(86) PCT No.: PCT/EP2014/075532
§ 371 (c)(1),
(2) Date: Aug. 12, 2016

(87) PCT Pub. No.: WO2016/082865
PCT Pub. Date: Jun. 2, 2016

(65) Prior Publication Data
US 2017/0054474 A1    Feb. 23, 2017

(51) Int. Cl.
*H01Q 1/36*    (2006.01)
*H04B 5/00*    (2006.01)
(Continued)

(52) U.S. Cl.
CPC ..... *H04B 5/0062* (2013.01); *G06K 19/07767* (2013.01); *H01F 27/2804* (2013.01);
(Continued)

(58) Field of Classification Search
None
See application file for complete search history.

(56) References Cited

U.S. PATENT DOCUMENTS

| 2007/0008140 A1* | 1/2007 | Saarisalo | G06K 7/0008 340/572.7 |
| 2011/0156640 A1* | 6/2011 | Moshfeghi | H02J 7/025 320/108 |

(Continued)

FOREIGN PATENT DOCUMENTS

| DE | 10003842 A1 | 8/2001 |
| DE | 202012012880 U1 | 5/2014 |

(Continued)

OTHER PUBLICATIONS

European Patent Office, Communication pursuant to Article 94(3) EPC for Application No. 15195870.9, dated Feb. 6, 2017, 7 pages, Germany.

(Continued)

*Primary Examiner* — Trinh Dinh
(74) *Attorney, Agent, or Firm* — Alston & Bird LLP (57) ABSTRACT

An RFID/NFC-system comprising a stationary RFID/NFC-interface (4) and a movable RFID/NFC-element (6, 6', 6"), wherein the stationary RFID/NFC-interface (4) comprises a stationary carrier (16) with a first coil (17) arranged for example on its upper surface (15) or on its lower surface and connected to a first RFID/NFC-chip (18), wherein the stationary carrier (16) is fixed with one of its side faces (5) to a mounting device (2), wherein the movable RFID/NFC-element (6, 6', 6") comprises a movable carrier (7, 7', 7") with a second coil (8, 8', 8") arranged for example on its upper surface (14) or on its lower surface, wherein the second coil (8, 8', 8") is connected or connectable to a second RFID/NFC-chip and wherein the movable RFID/NFC-element (6, 6', 6") can be moved with respect to the stationary RFID/NFC-interface (4) such that the upper surface (14) or the lower surface of the movable carrier (7, 7', 7") and the upper surface (15) or the lower surface of the stationary carrier (16) at least partly face each other such that (Continued)

signals can be transferred between the first coil (17) and the second coil (8, 8', 8"). Further an according RFID/NFC-element (6, 6', 6") is described.

15 Claims, 7 Drawing Sheets

(51) Int. Cl.
*H01F 38/14* (2006.01)
*G06K 19/077* (2006.01)
*H01Q 1/22* (2006.01)
*H01Q 1/24* (2006.01)
*H01Q 1/38* (2006.01)
*H01F 27/28* (2006.01)

(52) U.S. Cl.
CPC ........... *H01F 38/14* (2013.01); *H01Q 1/2225* (2013.01); *H01Q 1/2291* (2013.01); *H01Q 1/241* (2013.01); *H01Q 1/36* (2013.01); *H01Q 1/38* (2013.01); *H04B 5/0031* (2013.01); *H04B 5/0075* (2013.01); *H04B 5/0081* (2013.01)

(56) References Cited

U.S. PATENT DOCUMENTS

| | | |
|---|---|---|
| 2014/0159848 A1 | 6/2014 | Konanur et al. |
| 2014/0361634 A1* | 12/2014 | Scholz ................ H04B 5/0031 307/104 |
| 2015/0244175 A1 | 8/2015 | Abe |
| 2015/0248372 A1* | 9/2015 | Meyer-Graefe ..... H04B 5/0031 710/106 |
| 2015/0289394 A1* | 10/2015 | Kalhoff ................ H04B 5/0012 361/752 |
| 2016/0094051 A1* | 3/2016 | Soar ........................ H02J 5/005 307/9.1 |

FOREIGN PATENT DOCUMENTS

| | | |
|---|---|---|
| EP | 2299382 A1 | 3/2011 |
| WO | WO 2014/038107 A1 | 3/2014 |
| WO | WO 2014/111502 A1 | 7/2014 |
| WO | WO 2014/179869 A1 | 11/2014 |

OTHER PUBLICATIONS

European Patent Office, Communication pursuant to Article 94(3) EPC for Application No. 14821078.4, dated Dec. 7, 2016, Germany. 6 pages.

European Patent Office, Communication pursuant to Article 94(3) EPC for Application No. 14821078.4, dated Jun. 7, 2017, 7 pages, Germany.

International Searching Authority, International Search Report and Written Opinion for International Application No. PCT/EP2014/075532, dated Jul. 30, 2015, 10 pages. European Patent Office. The Netherlands.

* cited by examiner

RFID/NFC-SYSTEM AND AN RFID/NFC-ELEMENT

CROSS REFERENCE TO RELATED APPLICATIONS

This application is a National Stage Application, filed under 35 U.S.C. § 371, of International Application No. PCT/EP2014/075532, filed Nov. 25, 2014; the contents of which are hereby incorporated by reference in their entirety.

BACKGROUND

Related Field

The present invention relates to an RFID/NFC-system comprising a stationary RFID/NFC-interface and a movable RFID/NFC-element.

The present invention further relates to an according RFID/NFC-element.

Description of Related Art

Radio-Frequency-Identification-systems (RFID-systems) and Near-Field-Communication-systems (NFC-systems) are used for many years to wireless transmit data using inductive coupling. The required magnetic field is generated by antennas which are usually realized as small coils. Since the coils are small they only set up a so-called "near-field" with a range of a few centimeters. Therefore the coils have to be close to each other for transmitting data. The inductive coupling between two coils is strongest when the planes defined by the coils face each other and are oriented parallel to each other.

It should be noted that in the following the term "RFID/ NFC" describes elements of RFID-technology and/or NFC-technology.

Further hereinafter the term "RFID/NFC-interface" has to be understood in its broadest sense. An RFID/NFC-interface can be any device comprising at least a coil as an RFID/ NFC-antenna and an RFID/NFC-chip, i.e. any integrated circuit or other electronic component connected to the coil. For instance an RFID/NFC-interface can be a transmitter, a transponder, a transceiver, a tag or any other device that enables communication using RFID/NFC-technology.

In electrical engineering components are usually mounted to a mounting device, for example a top hat rail, especially a DIN rail. A stationary RFID/NFC-interface that is arranged on the circuit board of this component cannot communicate with a second, mobile RFID/NFC-interface since there is not enough space to bring the coils of the RFID/NFC-interfaces close enough together. Further the planes defined by the coils will neither be oriented parallel to each other nor will face each other. Thus an inductive coupling is impossible. For communicating with the stationary RFID/NFC-interface the component has to be dismounted.

An RFID/NFC-system that solves this problem is disclosed in DE 20 2012 012 880 U1. The disclosed RFID/ NFC-system comprises a stationary coil wherein the plane defined by this coil is arranged orthogonal to the circuit board of the component. This system is very complicate to manufacture and thus expensive.

BRIEF SUMMARY

It is therefore an object of the present invention to improve and further develop an RFID/NFC-system and an according RFID/NFC-element such that communication with the stationary RFID/NFC-interface is possible when the stationary RFID/NFC-device is fixed to a mounting device. Further the RFID/NFC-system and the RFID/NFC-element has to be realized with easy constructive elements and has to be inexpensive to manufacture.

In accordance with the invention, the aforementioned object is accomplished by a RFID/NFC-system comprising the features of claim 1. According to this claim, such an RFID/NFC-system comprises a stationary RFID/NFC-interface and a movable RFID/NFC-element, wherein the stationary RFID/NFC-interface comprises a stationary carrier with a first coil arranged for example on its upper surface or on its lower surface and connected to a first RFID/NFC-chip, wherein the stationary carrier is fixed with one of its side faces to a mounting device, wherein the movable RFID/ NFC-element comprises a movable carrier with a second coil arranged for example on its upper surface or on its lower surface, wherein the second coil is connected or connectable to a second RFID/NFC-chip and wherein the movable RFID/NFC-element can be moved with respect to the stationary RFID/NFC-interface such that the upper surface or the lower surface of the movable carrier and the upper surface or the lower surface of the stationary carrier at least partly face each other such that signals can be transferred between the first coil and the second coil.

According to the invention it has first been recognized that the aforementioned problem can be solved in a very easy way, if the mobile RFID/NFC-element can be arranged at least partly beneath the upper or lower surface of the stationary RFID/NFC-interface. With an according arrangement the coils can be brought together close enough for inductive coupling, especially the planes of the coils can be arranged at least partly parallel to each other. Further it has been recognized that it is sufficient to move an RFID/NFC-element comprising only a carrier and a coil with respect to the stationary RFID/NFC-interface. The RFID/NFC-element can be connected or connectable to an RFID/NFC-chip.

To achieve an even better inductive coupling the movable RFID/NFC-element could be arranged with respect to the stationary RFID/NFC-interface such that a plane of the first coil and a plane of the second coil at least partly face each other. Alternatively or additionally the planes of the first coil and the second coil could be arranged parallel to each other.

In a preferred manner the stationary carrier and/or the movable carrier can be a printed circuit board, wherein the first coil and/or the second coil could be etched or printed onto the printed circuit board. Alternatively or additionally the first coil and/or the second coil can be a planar coil. This will make the RFID/NFC-system easy to manufacture and therefore inexpensive. Further it is possible that the first coil and/or the second coil are arranged inside the stationary carrier and/or the movable carrier, wherein additionally the stationary carrier and/or the movable carrier can be a multilayer board.

In view of an easy mounting of the stationary RFID/NFC-interface the mounting device can be for example a top hat rail, especially a DIN rail.

Especially in regard to an industrial implementation at least two stationary RFID/NFC-interfaces can be fixed to the mounting device. Even more than two stationary RFID/ NFC-interfaces can be fixed to the mounting device as long as the movable RFID/NFC-element can be arranged according to the invention with respect to each of the RFID/NFC-interfaces. In a preferred embodiment the RFID/NFC-element can be moved between the stationary RFID/NFC-interfaces. With an according construction the movable RFID/NFC-element can be moved with respect to the stationary RFID/NFC-interface such that the upper surface or the lower surface of the movable carrier and the upper surface or the lower surface of the stationary carrier at least partly face each other such that signals can be transferred between the first coil and the second coil.

In particular in industrial implementation it can be necessary for reasons of safety to prevent the component and/or stationary RFID/NFC-interface from being touched. Therefore the stationary RFID/NFC-interface can comprise a housing with an opening for inserting the movable RFID/NFC-element. With this construction a reliable inductive coupling is achieved without being at risk of touching the stationary RFID/NFC-interface or other parts of the component.

Preferably the second coil of the mobile RFID/NFC-element is connected to a third coil for transmitting signals to or receiving signals from a portable RFID/NFC-interface. Put another way the mobile RFID/NFC-element serves as an extension of a portable RFID/NFC-interface. With an according extension all kinds of portable RFID/NFC-interfaces can be used for communicating with the stationary RFID/NFC-interface. Such portable RFID/NFC-interfaces can be a portable computer, a mobile phone, a smart phone or any other RFID/NFC-enable mobile device. It is further possible that the second coil and the third coil are arranged on the same carrier, for example a printed circuit board. The second coil and the third coil can be printed or etched onto the printed circuit board as planar coils and connected to each other.

In a preferred embodiment the third coil can be attached to the portable RFID/NFC-interface, especially an RFID/NFC-enabled mobile device, by adhesive means or by mechanical means. The third coil can be arranged on a substrate like a foil wherein at least one side of the foil comprises an adhesive such that the foil can be glued or stuck to the portable RFID/NFC-interface, for example an RFID/NFC-enabled mobile device.

Furthermore the movable RFID/NFC-element can be a part of a movable RFID/NFC-interface comprising an RFID/NFC-chip. Put another way the movable RFID/NFC-element can be a part of an RFID/NFC-enabled device such as an RFID/NFC-reader. The movable RFID/NFC-interface can comprise a display, particularly a liquid crystal display (LCD), and/or an operator control, particularly at least one key or button, and/or a communication port, for example an USB-port, and/or a power connection.

In a preferred embodiment the movable RFID/NFC-element, respectively the movable RFID/NFC-interface or movable RFID/NFC-reader, can be shielded against disturbing electromagnetic radiation with a foil, preferably made of ferrit.

The aforementioned object is further accomplished by an RFID/NFC-element comprising the features of claim 11. With regard to the advantages of an according RFID/NFC-element it is to be referred to the aforementioned description of the RFID/NFC-system.

BRIEF DESCRIPTION OF THE FIGURES

There are several ways how to design and further develop the teaching of the present invention in an advantageous way. To this end it is to be referred to the patent claims subordinate to patent claim 1 as well as to independent claim 11 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing

DETAILED DESCRIPTION OF VARIOUS EMBODIMENTS

Figure 1:
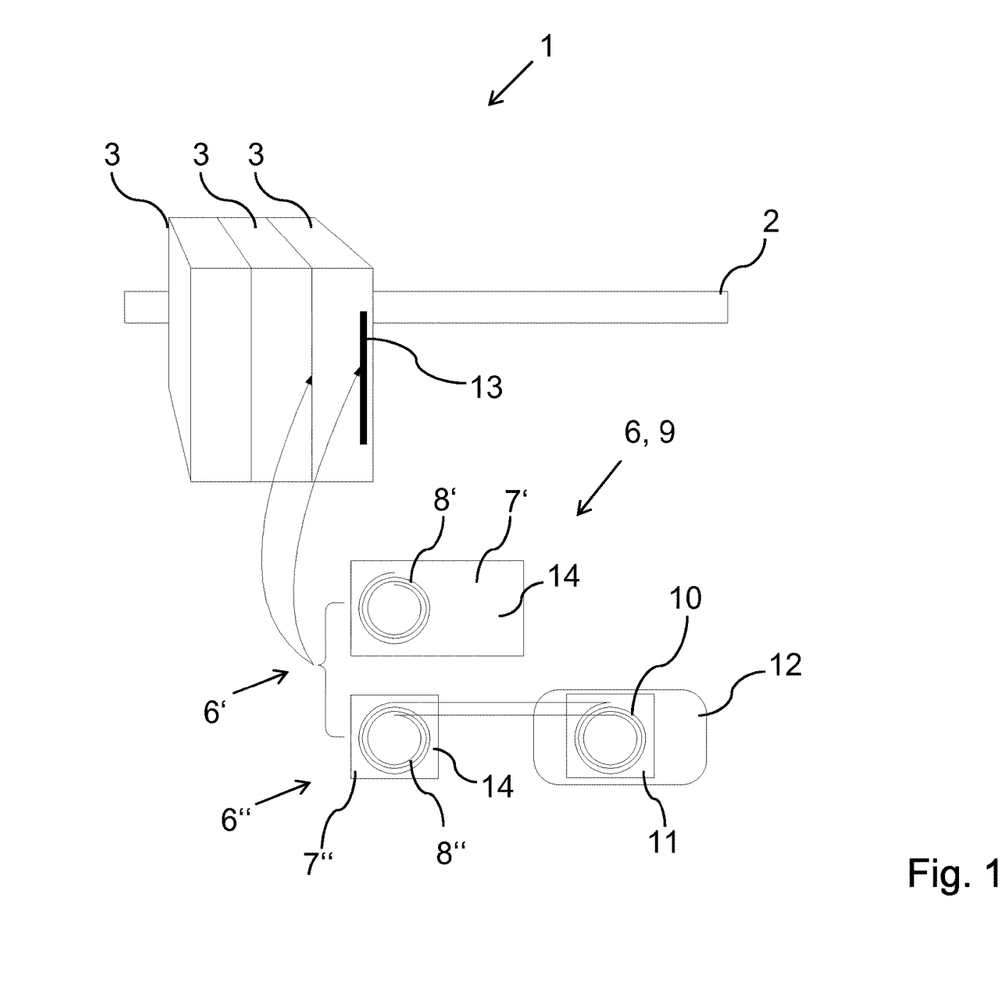
FIG. 1 is a schematic, perspective view of different embodiments of an RFID/NFC-system according to the invention.

FIG. 1 shows a schematic, perspective view of different embodiments of an RFID/NFC-system according to the invention. Three components 1 are mounted to mounting device 2, for example a top hat rail, especially a DIN rail 2. The components 1 comprise a housing 3 and a stationary RFID/NFC-interface 4 that is arranged inside the housing 3 and therefore not visible. The components 1 are fixed with one of their side faces to the mounting device, for example a top hat rail, especially as shown a DIN rail 2. Hence the stationary RFID/NFC-interface 4 is fixed to the DIN rail 2 with one of its not shown side faces 5, too.

FIG. 1 shows two different embodiments of a movable RFID/NFC-element 6. The first embodiment of an RFID/NFC-element 6' comprises a movable carrier 7' with a second coil 8'. The RFID/NFC-element 6' is part of a movable RFID/NFC-interface 9, for example an RFID/NFC-reader/writer, and is thus RFID/NFC-enabled.

The second embodiment of a movable RFID/NFC-element 6" comprises a movable carrier 7" with a second coil 8". The second coil 8" is connected to a third coil 10 arranged on a substrate 11. The substrate 11 is designed as a sticker such that the substrate 11 is attached to a portable RFID/NFC-interface 12 by adhesive means. In this embodiment the portable RFID/NFC-interface 12 is a mobile phone or smart phone. The RFID/NFC-element 6" and the third coil 10 serve as an extension for the portable RFID/NFC-interface 12.

As can further be seen from FIG. 1 the movable RFID/NFC-element 6, 6', 6" can be either inserted in an opening 13 of the housing 3 or moved between the components 1. When the RFID/NFC-element 6, 6', 6" is arranged inside the housing 3 or between the components 1, the upper surface 14 of the movable carrier 7, 7', 7" faces the not shown upper surface 15 of the not shown stationary carrier 16. Depending on the position of the not shown first coil 17 arranged on the stationary carrier 16 the movable RFID/NFC-element 6, 6', 6" can be arranged with respect to the stationary RFID/NFC-interface 4 such that a plane of the first coil 17 and a plane of the second coil 8 at least partly face each other. This leads to a very good inductive coupling between the first coil 17 and the second coil 8. Due to the good inductive coupling the first coil 17 and/or the second coil 8 can be operated with low power. Thereby the transmitting power of the first coil 17 and/or the second coil 8 is low such that the magnetic field generated by the first coil 17 and/or the second coil 8 will not interfere with adjacent devices. Hence each stationary RFID/NFC-interface 4 of each component 1 can communicate with the movable RFID/NFC-element 6, 6', 6" respectively the movable RFID/NFC-interface 9 or the portable RFID/NFC-interface 12.

Figure 2:
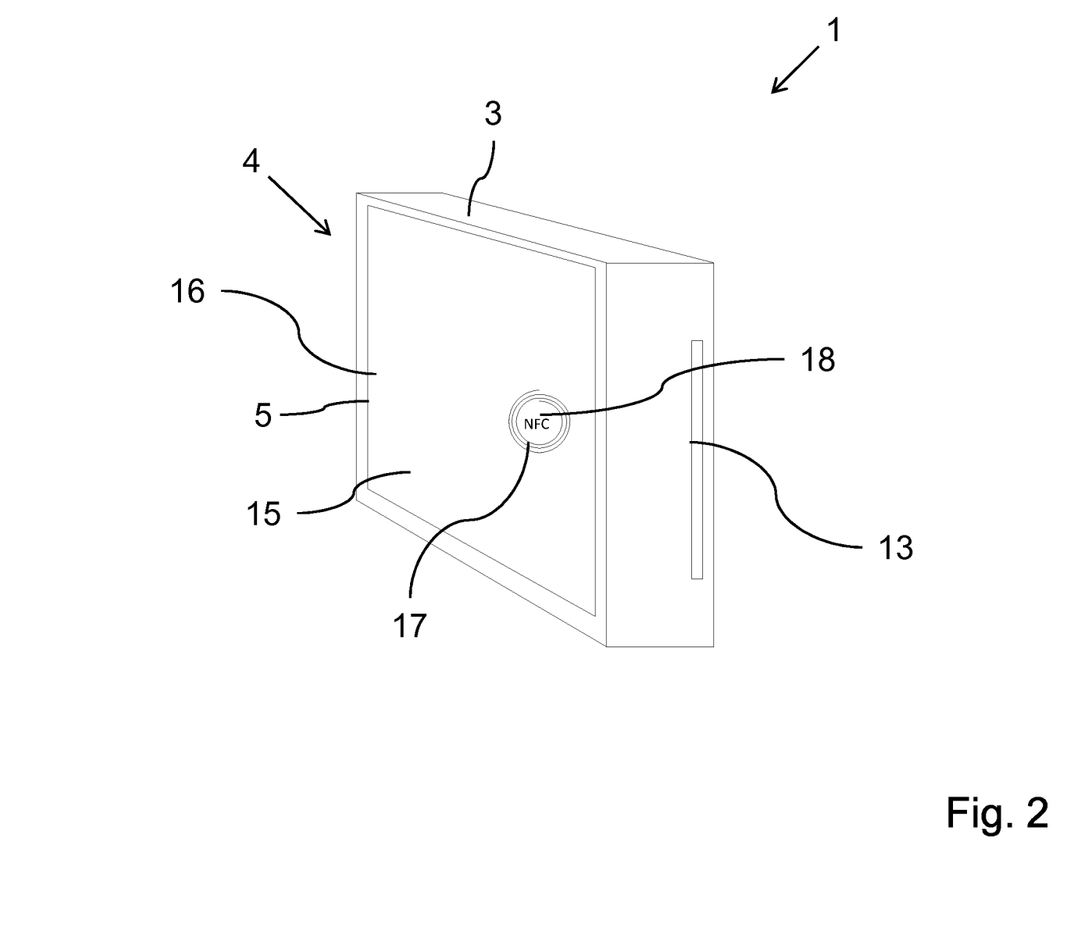
FIG. 2 is a schematic cutaway view of a component comprising an RFID/NFC-interface according to the invention.

FIG. 2 shows a schematic cutaway view of a component 1 comprising a stationary RFID/NFC-interface 4 arranged in a housing 3. The stationary RFID/NFC-interface 4 comprises a stationary carrier 16 with a first coil 17 and a RFID/NFC-chip 18 each arranged for example on the upper surface 15 of the stationary carrier 16. The housing 3 comprises an opening 13 for inserting a movable RFID/NFC-element 6. The housing 3 is fixable to a DIN rail 2 with its side face and therefore the stationary carrier 16 is fixed to the DIN rail 2 with its side face 5, too.

Figure 3:
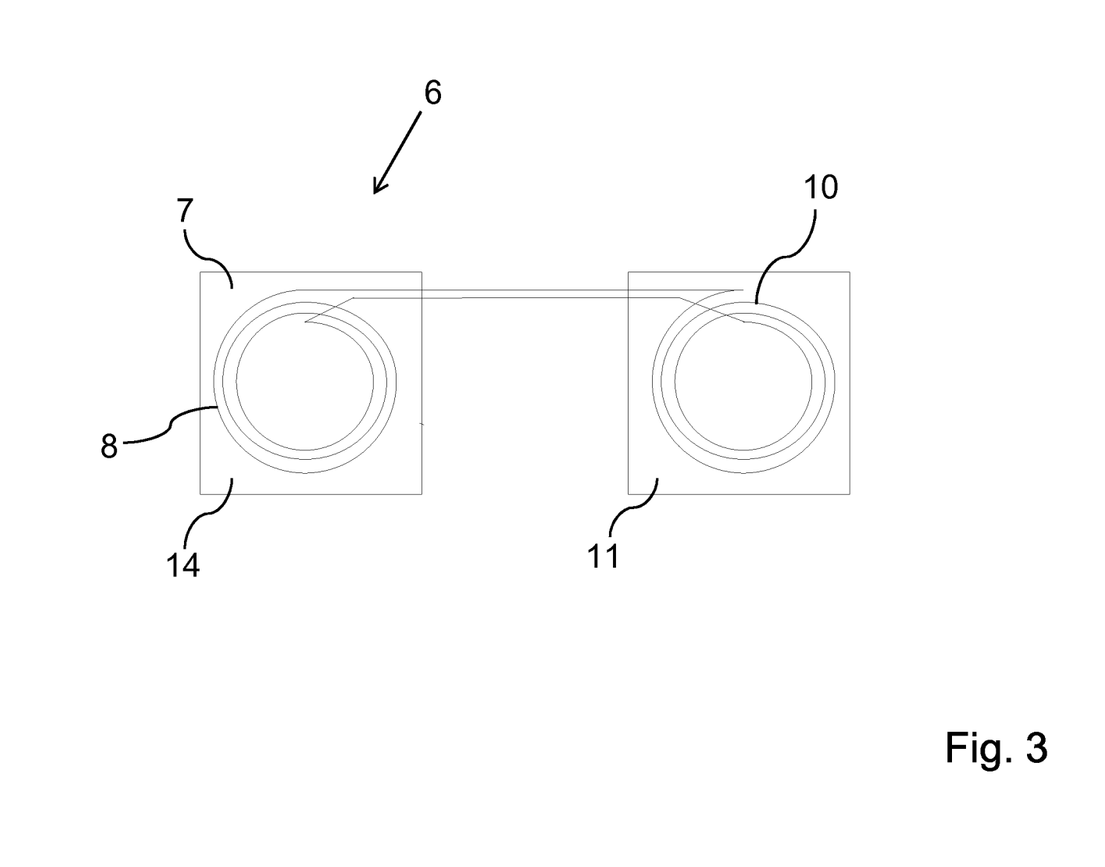
FIG. 3 is a schematic top view of a first embodiment of an RFID/NFC-element according to the invention.

FIG. 3 shows a first embodiment of a movable RFID/NFC-element 6 in a schematic top view. The movable RFID/NFC-element 6 comprises a movable carrier 7 with a second coil 8 arranged for example on its upper surface 14. The second coil 8 is connected to a third coil 10. Third coil 10 is arranged on a substrate 11. The substrate 11 can be a sticker such that the third coil 10 can be adhesively attached to an RFID/NFC-enabled device.

Figure 4:
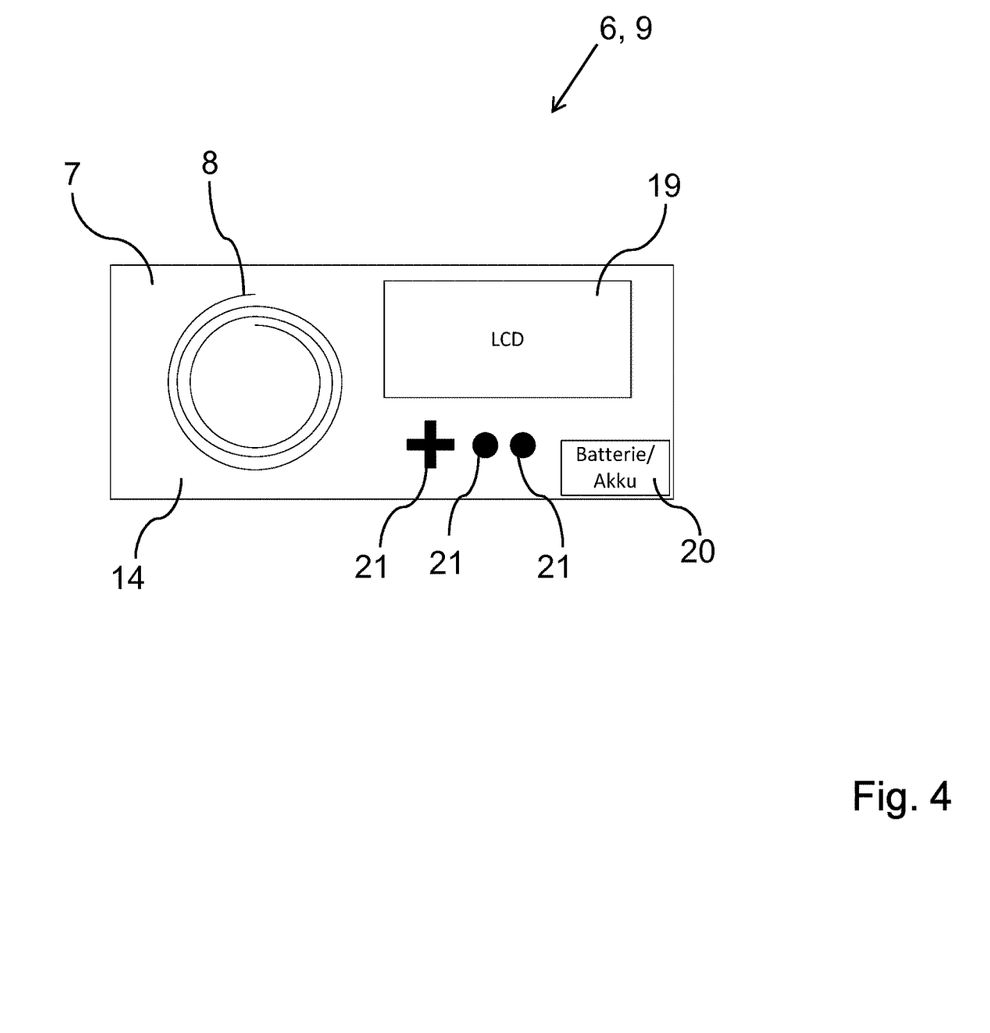
FIG. 4 is a schematic top view of a second embodiment of an RFID/NFC-element according to the invention.

FIG. 4 shows a second embodiment of a movable RFID/NFC-element 6 in a schematic top view. The movable RFID/NFC-element 6 is part of a movable RFID/NFC-interface 9, for example an RFID/NFC-reader. The movable RFID/NFC-element 6 comprises a movable carrier 7 with a second coil 8 arranged for example on the upper surface 14 of the movable carrier 7. Further the movable RFID/NFC-element 6 comprises an LCD 19, a battery 20 and keys 21 as operator control.

Figure 5:
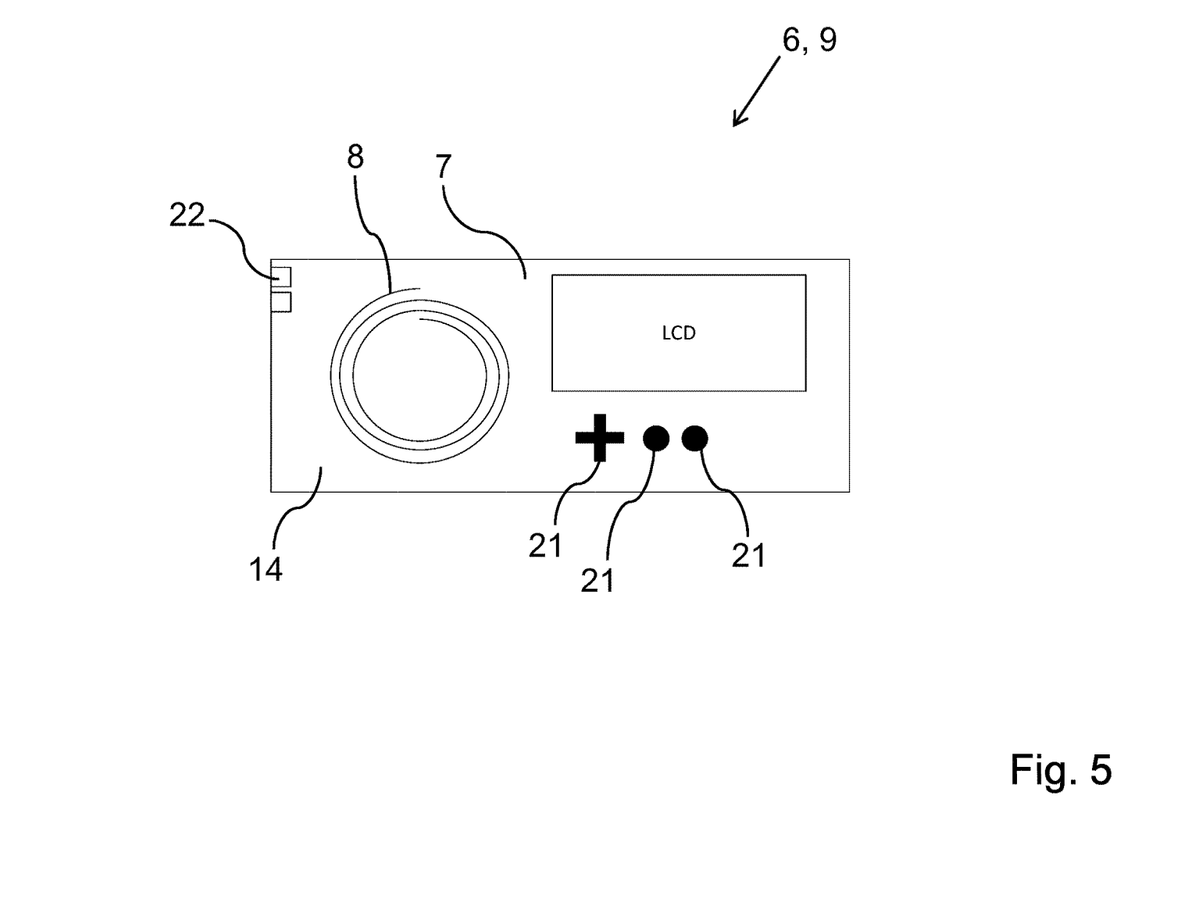
FIG. 5 is a schematic top view of a third embodiment of an RFID/NFC-element according to the invention.

FIG. 5 shows a third embodiment of a movable RFID/NFC-element 6 in a schematic top view. The movable RFID/NFC-element 6 of FIG. 5 differs from the movable RFID/NFC-element 6 of FIG. 4 only in that a power connection 22 instead of a battery 20 is arranged. Therefore the embodiment shown in FIG. 5 is especially suitable for industrial implementation.

Figure 6:
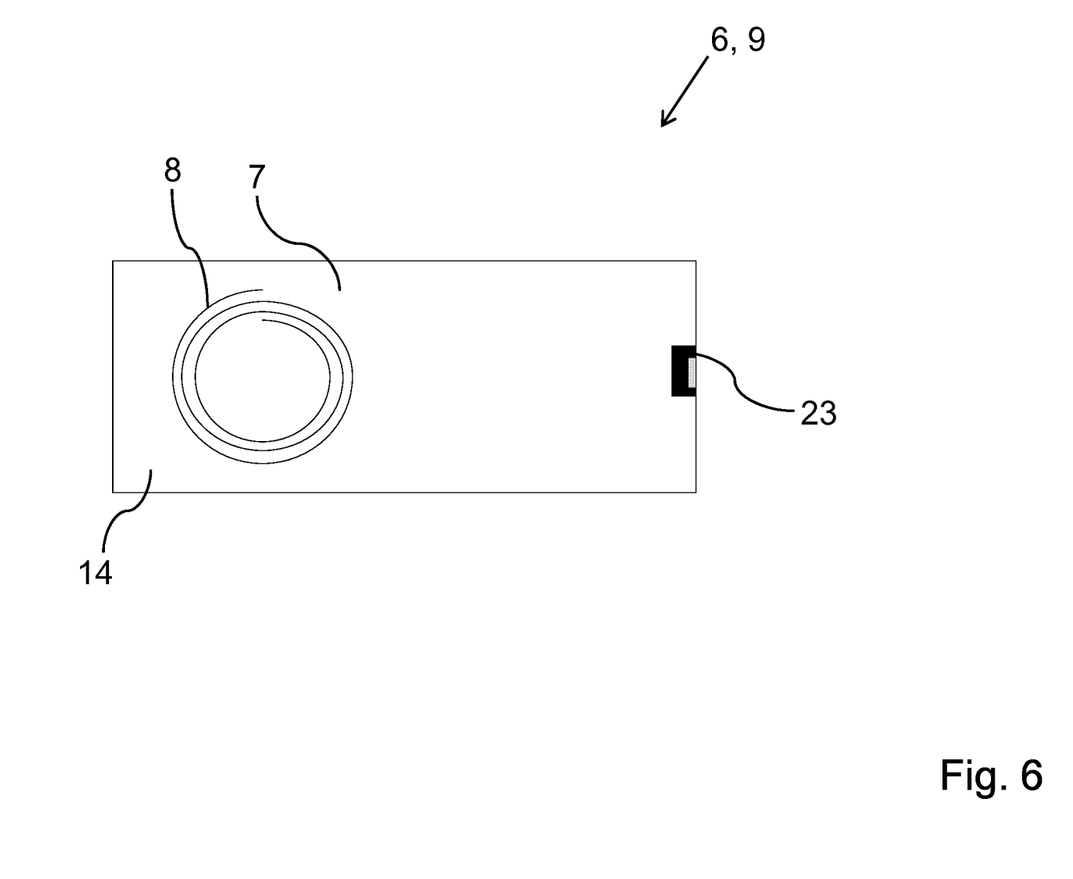
FIG. 6 is a schematic top view of a fourth embodiment of an RFID/NFC-element according to the invention.

FIG. 6 shows a third embodiment of a movable RFID/NFC-element 6 in a schematic top view. The movable RFID/NFC-element 6 of FIG. 6 differs from the movable RFID/NFC-element 6 of FIG. 4 in that an communication port 23, for example an USB-port, is arranged instead of an LCD 19, a battery 20 and keys 21. Hence the RFID/NFC-reader shown in FIG. 6 is simple in construction and therefore inexpensive to manufacture.

Figure 7:
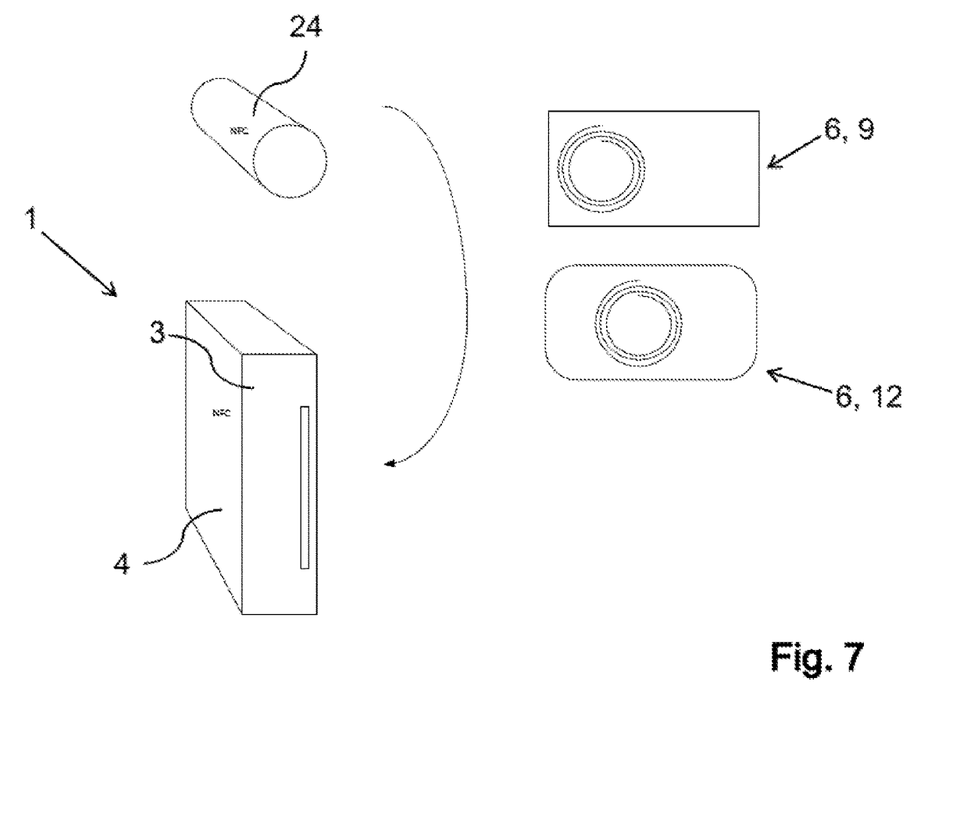
FIG. 7 is a schematic view of the parameter setting of a stationary RFID/NFC-element according to the invention.

FIG. 7 shows the parameter setting of a component 1 comprising a stationary RFID/NFC-interface 4 inside the housing 3. The stationary RFID/NFC-interface 4, for example an RFID/NFC-tag, can be parameterized by a RFID/NFC-reader 24 before mounting component 1 to the DIN rail 2. Parameter setting can involve storing a serial number in the Electrically Erasable Programmable Read-Only Memory (EEPROM) of the stationary RFID/NFC-interface 4. Hence the stationary RFID/NFC-interface 4 will serve as a type label. Alternatively or additionally other information can be stored to the stationary RFID/NFC-interface 4, too. After mounting the component 1 to the DIN rail 2 the stationary RFID/NFC-interface 4 can communicate with the movable RFID/NFC-element 6, for example a portable RFID/NFC-interface 12 or a movable RFID/NFC-interface 9. An RFID/NFC-system according to the invention can be utilized for inventory. Further the Firmware of the component 1 can be updated using an RFID/NFC-system of the invention.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 component
2 mounting device, DIN rail
3 housing
4 stationary RFID/NFC-interface
5 side face
6, 6', 6" movable RFID/NFC-element
7, 7', 7" movable carrier
8, 8', 8" second coil
9 movable RFID/NFC-interface
10 third coil
11 substrate
12 portable RFID/NFC-interface
13 opening
14 upper surface (movable carrier)
15 upper surface (stationary carrier)
16 stationary carrier
17 first coil
18 RFID/NFC-chip
19 LCD
20 battery
21 operator control (keys)
22 power connection
23 communication port
24 RFID/NFC-reader

The invention claimed is:
1. RFID/NFC-system comprising:
a stationary RFID/NFC-interface (4);
a movable RFID/NFC-element (6, 6', 6"); and
a portable RFID/NFC-interface (12),
wherein:
the stationary RFID/NFC-interface (4) comprises a stationary carrier (16) with a first coil (17) arranged on either an upper surface (15) of the stationary carrier (16) or on a lower surface of the stationary carrier (16) and connected to a first RFID/NFC-chip (18),
the stationary carrier (16) is fixed with one side face (5) of the stationary carrier (16) to a mounting device (2),
the movable RFID/NFC-element (6, 6', 6") comprises a movable carrier (7, 7', 7") with a second coil (8, 8', 8") arranged on either an upper surface (14) of the movable carrier (7, 7', 7") or on a lower surface of the movable carrier (7, 7', 7"),
the second coil (8, 8', 8") is connectable to a second RFID/NFC-chip,
the movable RFID/NFC-element (6, 6', 6") is movable with respect to the stationary RFID/NFC-interface (4) such that the upper surface (14) or the lower surface of the movable carrier (7, 7', 7") and the upper surface (15) or the lower surface of the stationary carrier (16) at least partly face each other such that signals can be transferred between the first coil (17) and the second coil (8, 8', 8");

the second coil (8, 8', 8") is connected to a third coil (10) for transmitting signals to or receiving signals from the portable RFID/NFC-interface (12);

the third coil (10) is attached on a substrate (11); and the substrate is configured as a sticker such that the substrate (11) is attachable to the portable RFID/NFC-interface (12) by adhesive means.

2. RFID/NFC-system according to claim 1, wherein the movable RFID/NFC-element (6, 6', 6") is arranged with respect to the stationary RDIF/NFC-interface (4) such that a plane of the first coil (17) and a plane of the second coil (8, 8', 8") at least partly face each other.

3. RFID/NFC-system according to claim 1, wherein:
at least one of the stationary carrier (16) or the movable carrier (7, 7', 7") is a printed circuit board; and
at least one of the first coil (17) or the second coil (8, 8', 8") is etched or printed onto the printed circuit board.

4. RFID/NFC-system according to claim 1, wherein:
at least one of the stationary carrier (16) or the movable carrier (7, 7', 7") is a printed circuit board; and
at least one of the first coil (17) or the second coil (8, 8', 8") is etched or printed as a planar coil onto the printed circuit board.

5. RFID/NFC-system according to claim 1, wherein at least two stationary RFID/NFC-interfaces (4) are fixed to the hat rail (2).

6. RFID/NFC-system according to claim 5, wherein the movable RFID/NFC-element (6, 6', 6") are movable between the stationary RFID/NFC-interfaces (4).

7. RFID/NFC-system according to claim 1, wherein the stationary RFID/NFC-interface (4) comprises a housing (3) with an opening (13) for inserting the movable RFID/NFC-element (6, 6', 6").

8. RFID/NFC-system according to claim 1, wherein the portable RFID/NFC-interface (12) is one or more of a portable computer, a mobile phone, a smartphone, or any other RFID/NFC-enabled mobile device.

9. RFID/NFC-system according to claim 1, wherein the third coil (10) is fixed to the portable RFID/NFC-interface (12) by adhesive means.

10. RFID/NFC-system according to claim 1, wherein the third coil (10) is fixed to the portable RFID/NFC-interface (12) by mechanical means.

11. RFID/NFC-system according to claim 1, wherein the movable RFID/NFC-element (6, 6', 6") is part of a movable RFID/NFC-interface (9) comprising an RFID/NFC-chip.

12. RFID/NFC-system according to claim 11, wherein the movable RFID/NFC-interface (9) comprises at least one of a display, an operator control (21), a battery (20), a communication-port (23), or a power connection (22).

13. RFID/NFC-system according to claim 12, wherein the display is a liquid crystal display (LCD) (19).

14. RFID/NFC-system according to claim 12, wherein the operator control (21) is at least one key (21) or button.

15. RFID/NFC-system according to claim 12, wherein the communication-port (23) is a USB-port.

\* \* \* \* \*